(12) United States Patent
Li et al.

(10) Patent No.: US 7,619,671 B2
(45) Date of Patent: Nov. 17, 2009

(54) METHOD, APPARATUS AND SYSTEM FOR CHARGE INJECTION SUPPRESSION IN ACTIVE PIXEL SENSORS

(75) Inventors: Xiangli Li, Boise, ID (US); Chen Xu, Boise, ID (US); Peter Parker Altice, Lake Oswego, OR (US); John Ladd, Boise, ID (US)

(73) Assignee: Aptina Imaging Corporation, Grand Cayman (KY)

( * ) Notice: Subject to any disclaimer, the term of this patent is extended or adjusted under 35 U.S.C. 154(b) by 486 days.

(21) Appl. No.: 11/488,110

(22) Filed: Jul. 18, 2006

(65) Prior Publication Data

US 2008/0018762 A1    Jan. 24, 2008

(51) Int. Cl.
 *H04N 3/14* (2006.01)
 *H04N 5/335* (2006.01)
(52) U.S. Cl. .................... 348/301; 348/294; 348/308
(58) Field of Classification Search ................ 348/294, 348/300–2, 308; 250/208.1; 257/291–2
See application file for complete search history.

(56) References Cited

U.S. PATENT DOCUMENTS

| | | |
|---|---|---|
| 4,434,441 A | 2/1984 | Ishizaki et al. |
| 5,900,623 A | 5/1999 | Tsang et al. |
| 6,140,630 A | 10/2000 | Rhodes |
| 6,204,524 B1 | 3/2001 | Rhodes |
| 6,310,366 B1 | 10/2001 | Rhodes et al. |
| 6,326,652 B1 | 12/2001 | Rhodes |
| 6,333,205 B1 | 12/2001 | Rhodes |
| 6,376,868 B1 | 4/2002 | Rhodes |
| 6,493,030 B1 * | 12/2002 | Kozlowski et al. .......... 348/310 |
| 6,522,395 B1 | 2/2003 | Bamji et al. |
| 6,535,247 B1 | 3/2003 | Kozlowski et al. |
| 6,635,857 B1 | 10/2003 | Kindt |
| 6,697,111 B1 * | 2/2004 | Kozlowski et al. .......... 348/302 |
| 6,903,394 B2 * | 6/2005 | Agarwal ..................... 257/292 |
| 7,116,365 B1 * | 10/2006 | Ueno et al. ................. 348/308 |
| 2002/0196352 A1 | 12/2002 | Boemler |
| 2003/0128405 A1 | 7/2003 | Tay |
| 2005/0062867 A1 * | 3/2005 | Mabuchi ..................... 348/308 |
| 2005/0083422 A1 * | 4/2005 | Lee et al. .................... 348/308 |
| 2008/0135895 A1 * | 6/2008 | Lee et al. .................... 257/290 |

* cited by examiner

*Primary Examiner*—Sinh Tran
*Assistant Examiner*—Daniel M Pasiewicz
(74) *Attorney, Agent, or Firm*—Dickstein Shapiro LLP

(57) ABSTRACT

A method and apparatus are provided for operation of an image sensor during signal readout. During a reset operation the gate of a reset transistor coupled to the storage node receives a voltage greater than a threshold voltage to produce a reset of the storage node. During a period where photogenerated charges stored at the storage node are read out the gate of the reset transistor receives a voltage $V_{RST\_LOW}$ greater than ground, but less than a maximum voltage which can be stored at the storage node.

24 Claims, 8 Drawing Sheets

METHOD, APPARATUS AND SYSTEM FOR CHARGE INJECTION SUPPRESSION IN ACTIVE PIXEL SENSORS

FIELD OF THE INVENTION

The invention relates generally to imaging devices and more particularly to charge injection suppression in active pixel image sensors.

BACKGROUND OF THE INVENTION

A CMOS imager circuit includes a focal plane array of pixel cells. Each one of the pixel cells includes a photosensor, which may be a photogate, photoconductor or a photodiode overlying a substrate for accumulating photo-generated charge in the underlying portion of the substrate. A readout circuit is connected to each pixel cell and typically includes an output field effect transistor formed in the substrate and a charge transfer section, typically a floating diffusion node, formed on the substrate adjacent the photosensor connected to the gate of the output transistor.

The active elements of an individual pixel cell in a CMOS imager circuit perform a number of functions, including: (1) photon to charge conversion; (2) accumulation of image charge; (3) resetting the storage region to a known state before the transfer of charge to it; (4) transfer of charge to the storage region; (5) selection of a pixel for readout; and (6) output and amplification of a signal representing pixel charge. Photo charge may be amplified when it moves from the initial charge accumulation region to the floating diffusion node. The charge is typically converted to a pixel output voltage by a source follower output transistor.

FIG. 1 is a top plan view of a typical CMOS imager pixel cell 10. FIG. 2 is a schematic diagram of the CMOS imager pixel of FIG. 1. As is known in the art, a pixel cell receives photons of light and converts those photons into charge carried by electrons. To perform this function, each pixel cell 10 includes a photosensor 20. The photosensor, which can be a photogate, photoconductor, pinned photodiode, or other photosensitive device, includes a charge accumulation region 30 which accumulates electrons produced by photons of light.

Each pixel cell also includes a transfer transistor 40 for transferring charge from the charge accumulation region 30 to a floating diffusion region 50, and a reset transistor 60 for resetting the floating diffusion region 50 to a predetermined charge level, $V_{AA\text{-}PIX}$, prior to charge transfer. The pixel cell 10 also may include a source follower transistor 70 for receiving and amplifying a charge level from the diffusion region 50 and a row select transistor 80 for controlling the readout of the pixel cell 10 contents from the source follower transistor 70. The reset transistor 60, source follower transistor 70, and row select transistor 80 include source/drain regions 120, 130, and 140. There is also a contact to the gate of the source follower transistor 70.

Each pixel cell includes several contacts, such as 90, 100, and 110, to provide electrical connections for the pixel cell 10. For example, in the embodiment shown in FIG. 1, a source/drain region of the reset transistor 60 is electrically connected to an array voltage source terminal ($V_{AA\text{-}PIX}$) through contact 100, the gate of the source follower transistor 70 is connected to the floating diffusion region 50 through contact 90, and an output voltage $V_{OUT}$ is output from the pixel cell 10 through contact 110.

FIG. 3 illustrates a block diagram of a CMOS imager circuit 190 having a pixel array 200 with each pixel cell being constructed as described above. Pixel array 200 comprises a plurality of pixels arranged in a predetermined number of rows and columns. A plurality of row and column lines are provided for the entire array 200, selectively activated by the row driver 210 in response to row address decoder 220 and the column driver 260 in response to the column address decoder 270. Thus, a row and column address is provided for each pixel. The CMOS imager circuit 190 is operated by the control circuit 250, which controls address decoders 220 and 270 for selecting the appropriate row and column lines for pixel readout, and row and column driver circuitry 210 and 260, which apply driving voltage to the drive transistors of the selected row and column lines.

CMOS imager pixels cells and circuits of the type described above are generally known as discussed, for example, in the U.S. Pat. No. 6,140,630, U.S. Pat. No. 6,376,868, U.S. Pat. No. 6,310,366, U.S. Pat. No. 6,326,652, U.S. Pat. No. 6,204,524 and U.S. Pat. No. 6,333,205, assigned to Micron Technology, Inc., which are hereby incorporated by reference in their entirety.

A problem that causes error in CMOS imager circuit output is the injection of unwanted charges into the data path. In a CMOS imager pixel, there are several common sources of charge injection, including charge-to-voltage conversion error charges, redistribution of transistor channel charges after the transistors are switched off, and redistribution of charges accumulated by charge coupling from the reset transistor 60 gate-source overlap capacitor $C_{OVL}$. Charge injection will introduce an unknown amount of "noise" charge into the floating diffusion region 50, decreasing the accuracy of the output signal $V_{OUT}$. This problem is commonly addressed by using a correlated double sampling (CDS) technique to subtract the noise value from the signal, as described below.

FIG. 4 shows a timing diagram of a typical CMOS imager circuit performing CDS. In performing CDS, generally, first a reset pulse RST is applied to the gate of the reset transistor 60, turning on the transistor 60 and charging the floating diffusion region 50 to $V_{AA\text{-}PIX}$ less the voltage drop $V_{TH}$ of the transistor 60. Accordingly, the floating diffusion region is set to a known reference value $V_{AA\text{-}PIX}\text{-}V_{TH}$. The charge on the floating diffusion region 50 is applied to the gate of the source follower transistor 70 to control the current passing through the row select transistor 80. Upon the pulse of a signal SHR, a voltage based on the current is stored by sample and hold circuit 265. After the floating diffusion region 50 has been set and the reference voltage stored, charge collected in the charge accumulation region 30 by the photosensor 20 is transferred from the charge accumulation region 30 to the floating diffusion region 50 by the pulse of a signal TX to the gate of the transfer transistor 40. Upon the pulse of a signal SHS, the new output charge in the floating diffusion region 50 is translated to an output voltage that is stored in the sample and hold circuit 265. As shown in FIG. 3, the sample and hold circuit outputs two signals, corresponding to the stored sampled vales of the reference value Vrst and the photosensor accumulated charge value Vsig. These two signals are subtracted by a differential amplifier 267 to produce the signal Vrst-Vsig, which represents the amount of light impinging on the pixel less certain unwanted noise charges. This difference signal is digitized by an analog to digital converter 275. The digitized pixel signals are then fed to an image processor 280 to form a digital image.

However, not all unwanted charge injection can be subtracted out using CDS. Some of the active elements of CDS may be a source of charge injection themselves. Particularly, as the reset transistor 60 is not an ideal switch, when it turns off some portion of the channel charges will relocate to the floating diffusion region 50. CDS can also cause other problems by reducing the available voltage swing on the floating diffusion region 50, thereby increasing lag and reducing the dynamic range of the pixel output signal Vsig. This problem is expected to get worse as developments trend to the scaling of the floating diffusion region 50 area to achieve higher conversion gain.

Accordingly, it would be advantageous to have an improved image sensor to help suppress charge injection without contributing to lag or reducing the available voltage swing on the floating diffusion region.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

Figure 1:
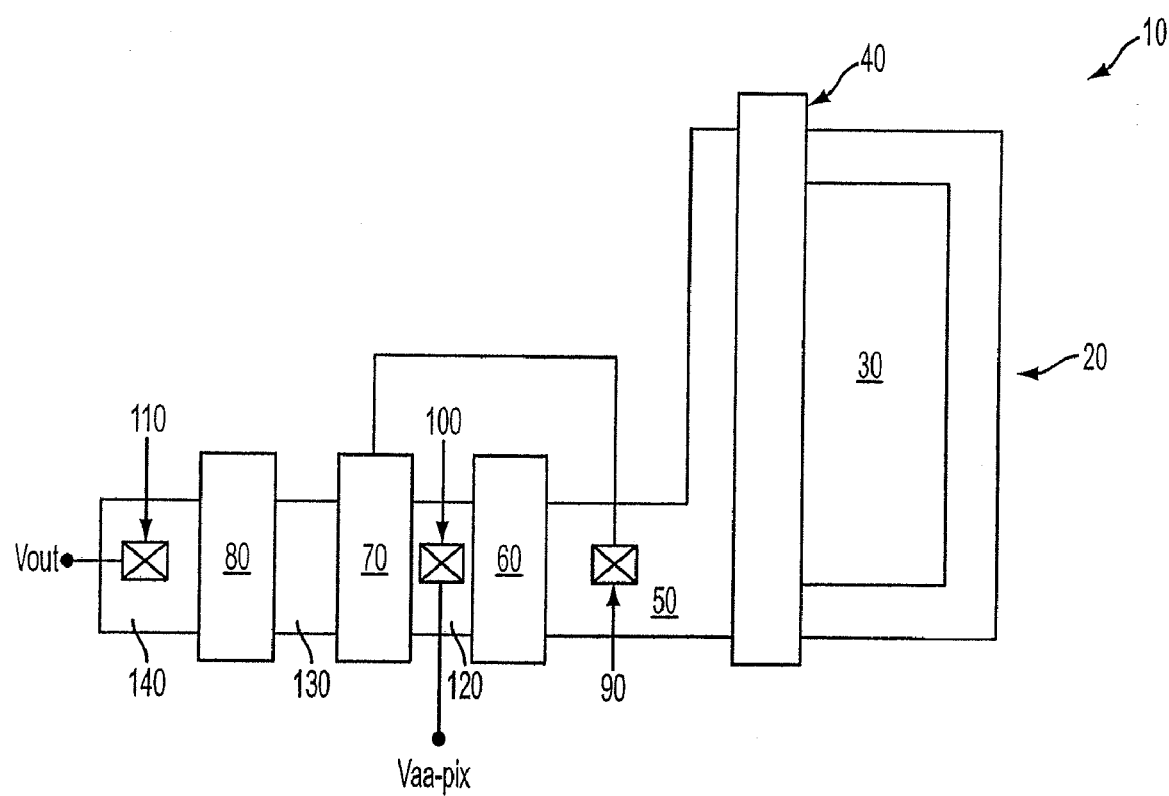
FIG. 1 is a top plan view of a typical CMOS imager pixel cell.

In the following detailed description, reference is made to the accompanying drawings, which are a part of the specification and which illustrate various embodiments in which the invention may be practiced. In the drawings, like reference numerals describe substantially similar components throughout the several views. These embodiments are described in sufficient detail to enable those skilled in the art to practice the invention, and it is to be understood that other embodiments may be utilized, and that structural, logical and electrical changes may be made without departing from the spirit and scope of the present invention.

The term "substrate" is understood as interchangeable and as including silicon, silicon-on-insulator (SOI) or silicon-on-sapphire (SOS), doped and undoped semiconductors, epitaxial layers of silicon supported by a base semiconductor foundation, and other semiconductor structures. Furthermore, when reference is made to a "substrate" in the following description, previous steps may have been utilized to form regions, junctions or material layers in or on the base semiconductor structure or foundation. In addition, the semiconductor need not be silicon-based, but could be based on silicon-germanium, germanium, gallium arsenide, or other known semiconductor materials.

The term "pixel" or "pixel cell" refers to a picture element unit cell containing a photo-conversion device for converting electromagnetic radiation to an electrical signal. The embodiments of pixels discussed herein are illustrated and described as employing a four transistor (4T) pixel circuit for the sake of example only. It should be understood that the invention may be used with other pixel arrangements.

Although the invention is described herein with reference to the architecture and fabrication of one pixel cell, it should be understood that this is representative of a plurality of pixels in an array of an imager device. In addition, although the invention is described below with reference to a CMOS imager, the invention has applicability to any solid state imaging device having pixels. Other solid state imagers may use similar circuits in an output stage or other stage of an imager. Accordingly, the following detailed description is not to be taken in a limiting sense or as limiting to use in CMOS imagers, and the scope of the present invention is defined only by the appended claims.

Figure 4:
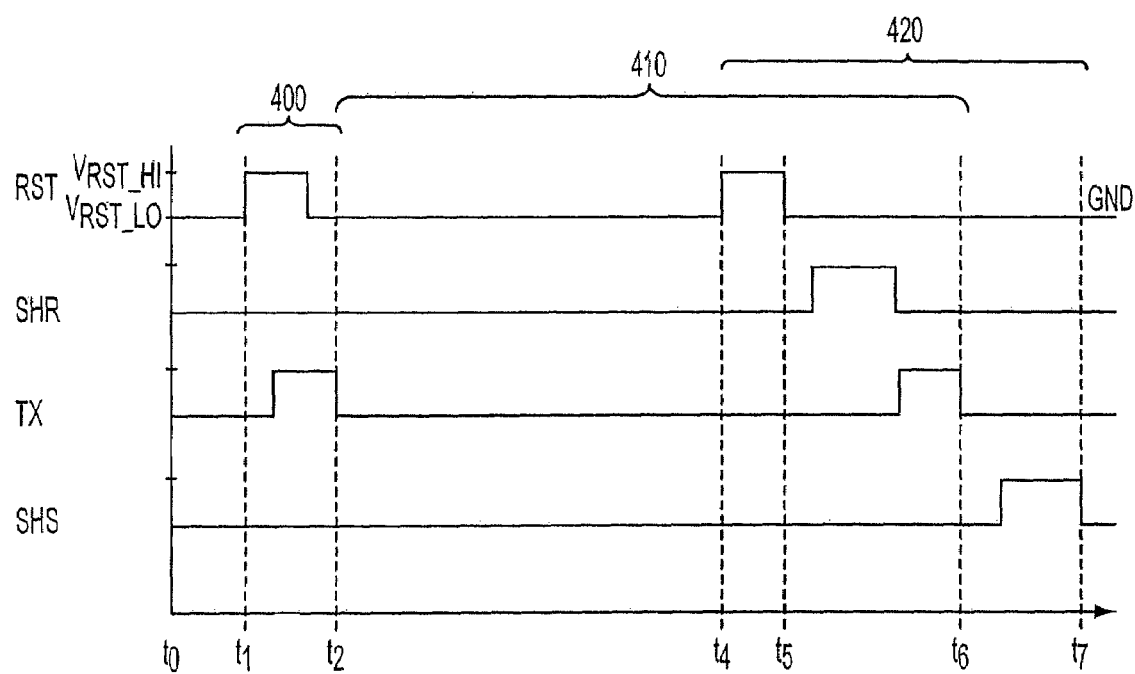
FIG. 4 is a timing diagram of a typical CMOS imager circuit.

Referring back to the timing diagram for operation of a typical CMOS imager, generally, there are three periods of signal timing. The first is the reset period 400, initiated at $t_1$ by a pulse of the RST signal, followed by a pulse of the TX signal. The photosensor is reset during the reset period 400. The second period, the integration period 410, begins at $t_2$ on the falling edge of the TX signal, which also marks the end of the photosensor reset period. During the integration period, charges are collected by the photosensor. The integration period overlaps a portion of the third period, which is the readout period 420, illustrated as time $t_4$-$t_7$ in FIG. 4. The falling edge of the TX signal at $t_6$ marks the end of the integration period. The signals RST, SHR, TX, and SHS are commonly held in a low or ground state for the duration of the integration period until the beginning of the readout 420, though RST may be held high.

CDS and the reading of the output of the pixel signal take place during the readout period. CDS is initiated by a pulse on the RST signal from $V_{RST\_LOW}$ up to $V_{RST\_HI}$ and dropping back to $V_{RST\_LOW}$. The rise of the RST signal past the reset transistor 60 threshold voltage marks the beginning of the readout period. Subsequent to this time, marked by $t_4$ in FIG. 4, the reset transistor 60 is in the on state and a channel exists from the source to the drain. As the signal falls from $V_{RST\_HI}$ back to $V_{RST\_LOW}$, channel charges are injected into both the source and the drain end of the reset transistor 60. The channel disappears as the signal drops below the threshold voltage and at $t_5$ the signal reaches $V_{RST\_LOW}$, which is ground. During the remainder of the readout period $V_{RST\_LOW}$ conventionally remains ground in order to minimize the unwanted charge leakage from floating diffusion region 50 to $V_{AAPIX}$. The pulse SHR controls the reset signal sample and hold circuit and this denotes the sample and hold period for the reset signal Vrst. The pulse SHS controls the photocharge generated signal sample and hold circuit and this denotes the sample and hold period for the photocharge generated signal Vsig.

Figure 5:
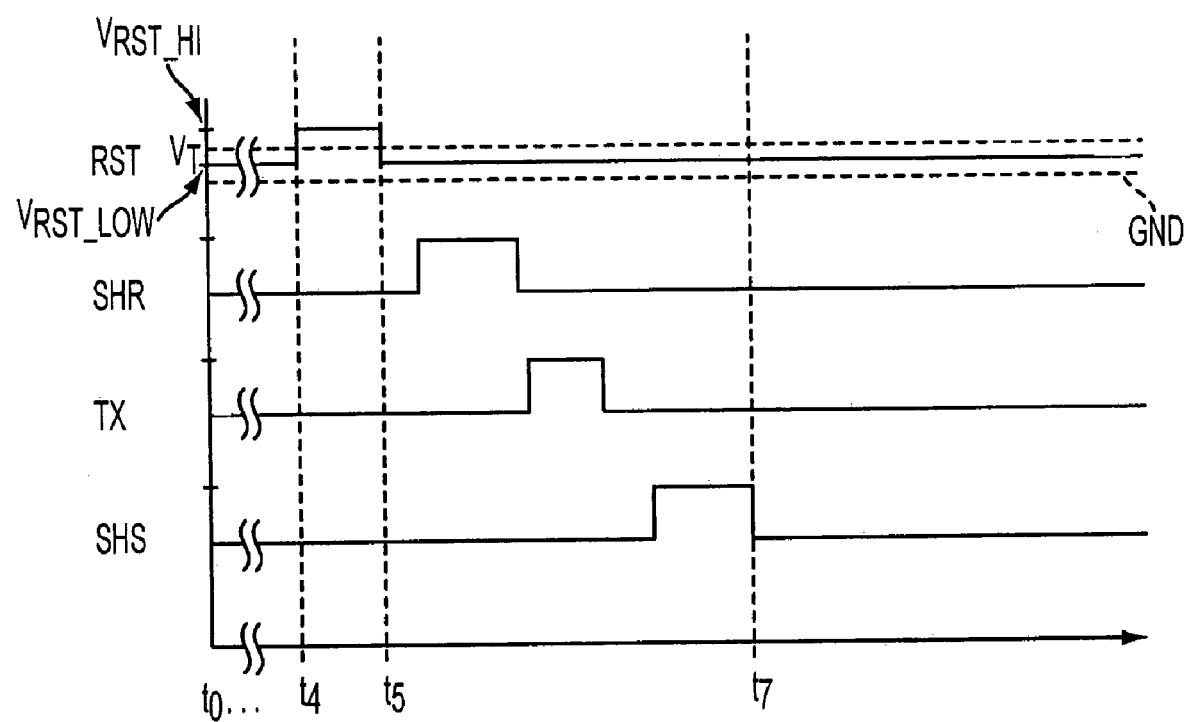
FIG. 5 is a timing diagram of a CMOS imager circuit operated in accordance with an embodiment of the invention.

FIG. 5 illustrates a timing diagram of the readout period of a CMOS imager circuit according to an embodiment of the invention. Rather than dropping the RST signal to $V_{RST\_LOW}$ ground, $V_{RST\_LOW}$ is dropped to a positive voltage, greater than ground but less than a value which would cause the reset transistor to turn on. The maximum value of the $V_{RST\_LOW}$ is explained further below. $V_{RST\_LOW}$ is maintained at this positive voltage level for the remainder of the readout period. The benefits of this will be made clear below. Prior to and subsequent to the readout period, RST may be held at ground or at $V_{RST\_HI}$, where $V_{RST\_HI}$ can be a voltage greater than the threshold voltage $V_T$ of the reset transistor and may be set as high as the reset transistor supply voltage $V_{AAPIX}$ plus the reset transistor threshold voltage $V_T$. Thus, $V_T < V_{RST\_HI} \leq V_T + V_{AAPIX}$. For convenience, FIG. 5 shows RST oscillating between two levels, $V_{RST\_LOW}$ and $V_{RST\_H}$.

Figure 6:
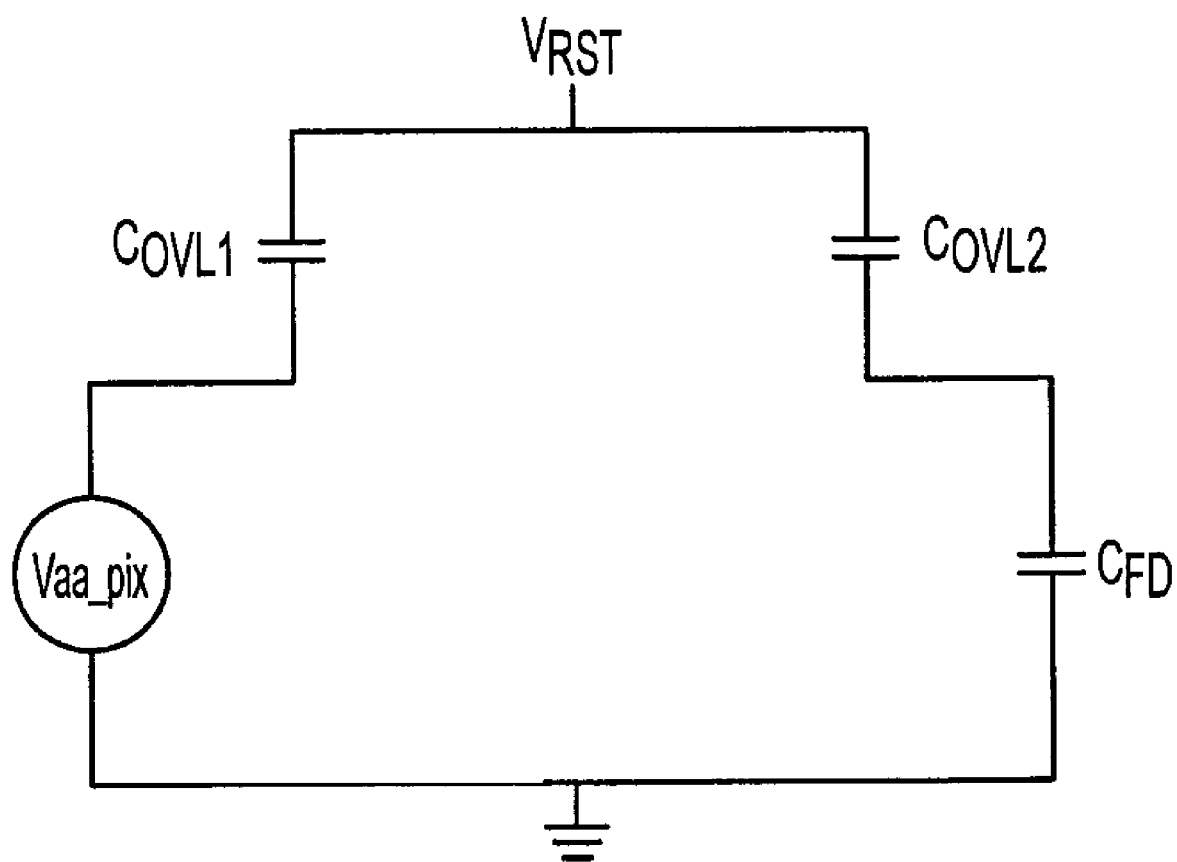
FIG. 6 is an equivalent circuit of a portion of a circuit in accordance with an embodiment of the invention.

FIG. 6 is an equivalent circuit diagram of the CMOS pixel imager cell when the RST transistor 60 is in the off state which further explains the maximum voltage which may be used for $V_{RST\_LOW}$ in an exemplary embodiment of the invention to reduce unwanted charge injection. The FIG. 6 circuit occurs when $V_{RST\_LOW}$ drops below $V_{AAPIX}+V_T$. The RST signal is represented as a voltage source $V_{RST}$, reset transistor 60 gate-drain overlap capacitor as $C_{OVL1}$, reset transistor 60 gate-source overlap capacitor as $C_{OVL2}$, and floating diffusion region 50 capacitance as $C_{FD}$. After the reset transistor 60 has switched off, the channel charges will redistribute as charge injection error voltage $\Delta V_{INJ}$ to $V_{RST}$ and $C_{OVL2}$. Additional charge at $V_{RST}$ is inconsequential, however, additional charge at the gate-source overlap capacitor $C_{OVL2}$ is a primary contributor to unwanted charge injection in the floating diffusion region 50. Solving KVL for the circuit for $\Delta V_{INJ}$ will yield the following expression:

$$\Delta V_{INJ} \approx C_{OVL2}(V_{AAPIX}+V_T-V_{RST\_LOW})/(C_{FD}+C_{OVL1})$$

Accordingly, it can be seen that there is a range of values of $V_{RST\_LOW}$ greater than ground which if applied will lead to a lower $\Delta V_{INJ}$. However, $V_{RST\_LOW}$ should not be maintained at a value high enough to risk causing unwanted leakage of the collected charge from the floating diffusion region 50 to $V_{AAPIX}$. To ensure no lost of collected charge while maintaining a positive voltage, $V_{RST\_LOW}$ should not exceed the maximum voltage of the floating diffusion region. Thus, as $V_{RST\_LOW} < V_{FD}$ the following equations can be derived:

$$V_{RST\_LOW\,MAX}=V_{AAPIX}-V_{SIGMAX} \approx V_{AAPIX}-V_{PIN}(C_{PD}/C_{FD})$$

where $V_{SIGMAX}$ is the maximum signal voltage from the photosensor 20, $V_{PIN}$ is the pinned voltage of the photodiode, representing the maximum charge collected by the photosensor, $C_{PD}$ is the capacitance of the photosensor and $V_{RST\_LOW\;MAX}$ is the maximum positive value to which $V_{RST\_LOW}$ may be maintained during the readout period. For illustrative purposes, in a circuit having values $V_{AAPIX}=2.8$ v, $V_{PIN} \sim 1.5$ v, $C_{PD}=1$fF and $C_{FD}=2$fF, $V_{RST\_LOW\,MAX}$ would be 2.05 volts.

Figure 2:
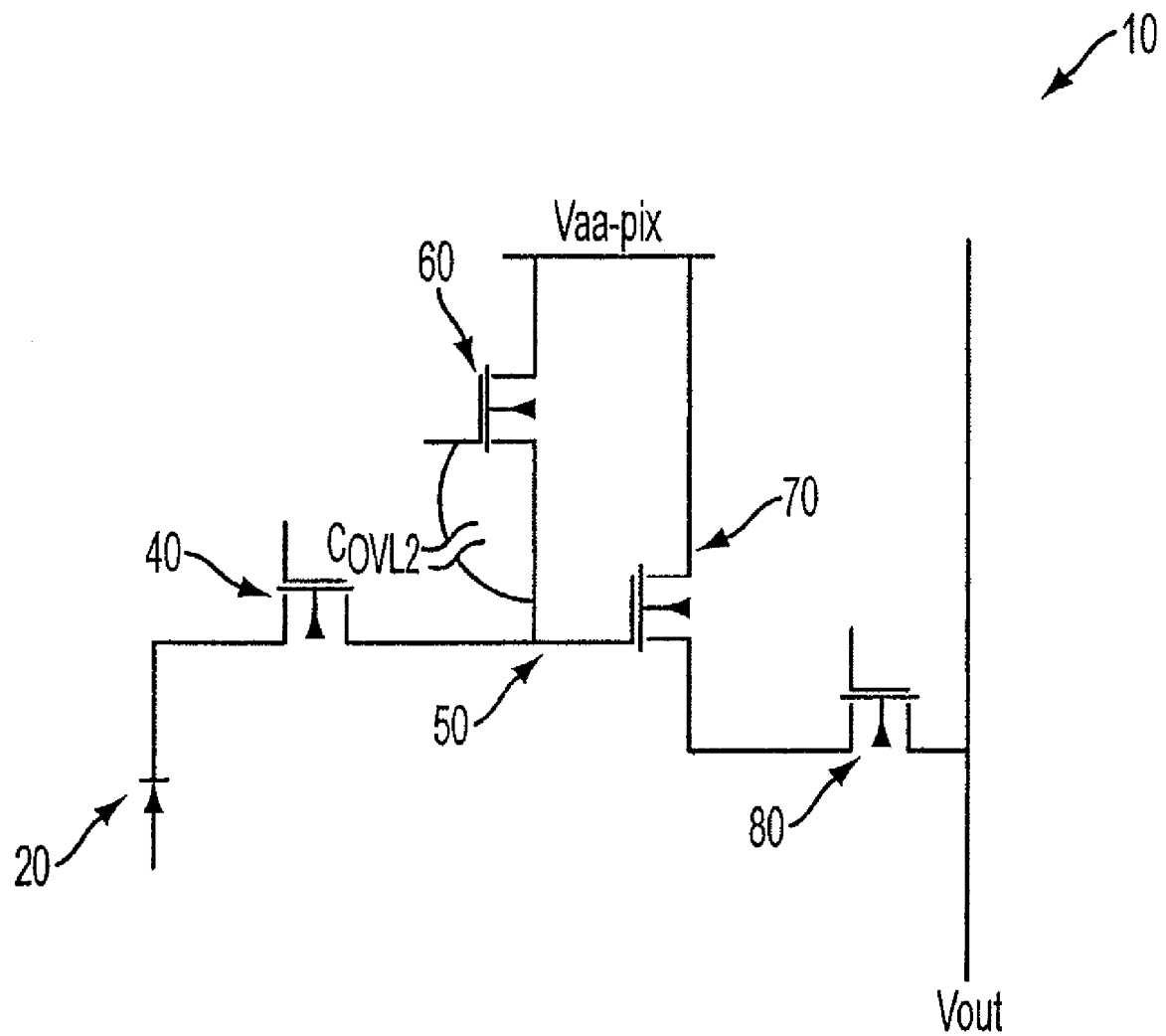
FIG. 2 is a schematic diagram of the CMOS imager pixel cell of FIG. 1.
Figure 3:
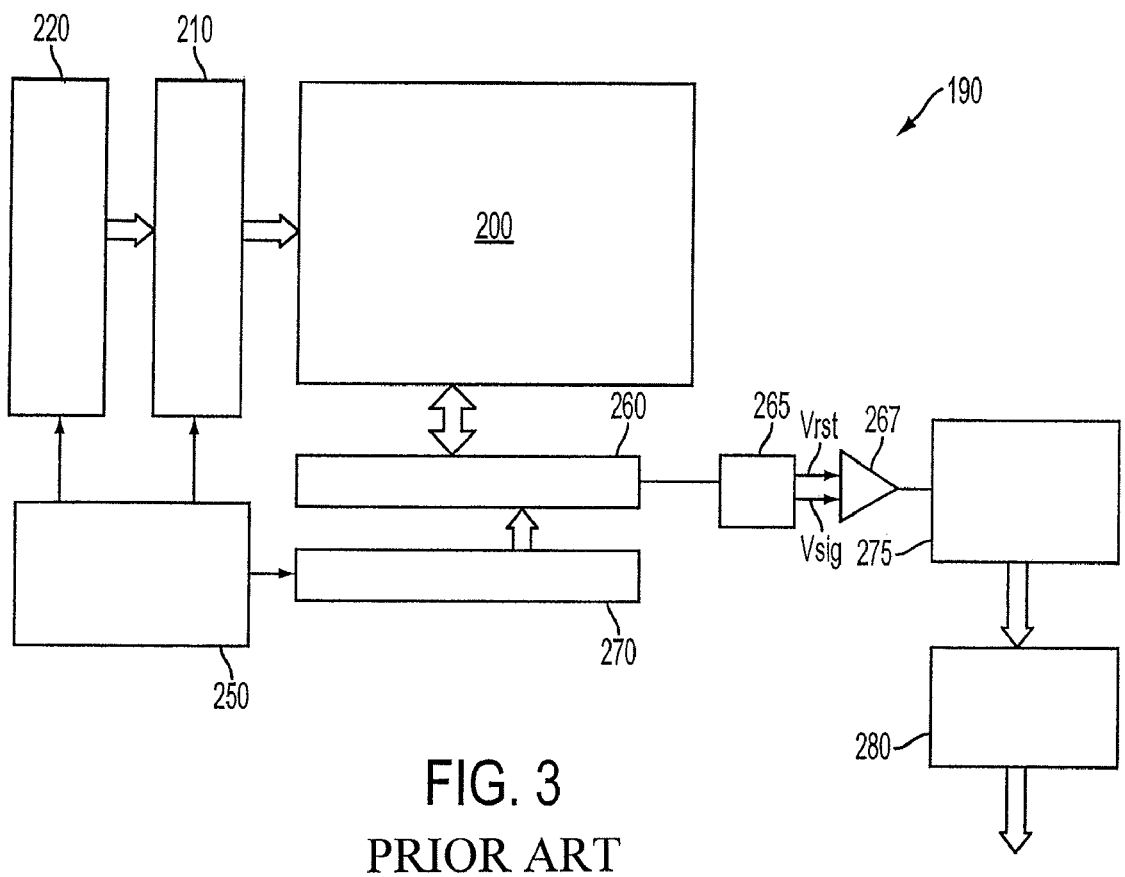
FIG. 3 is a block diagram of a typical CMOS imager circuit.
Figure 7:
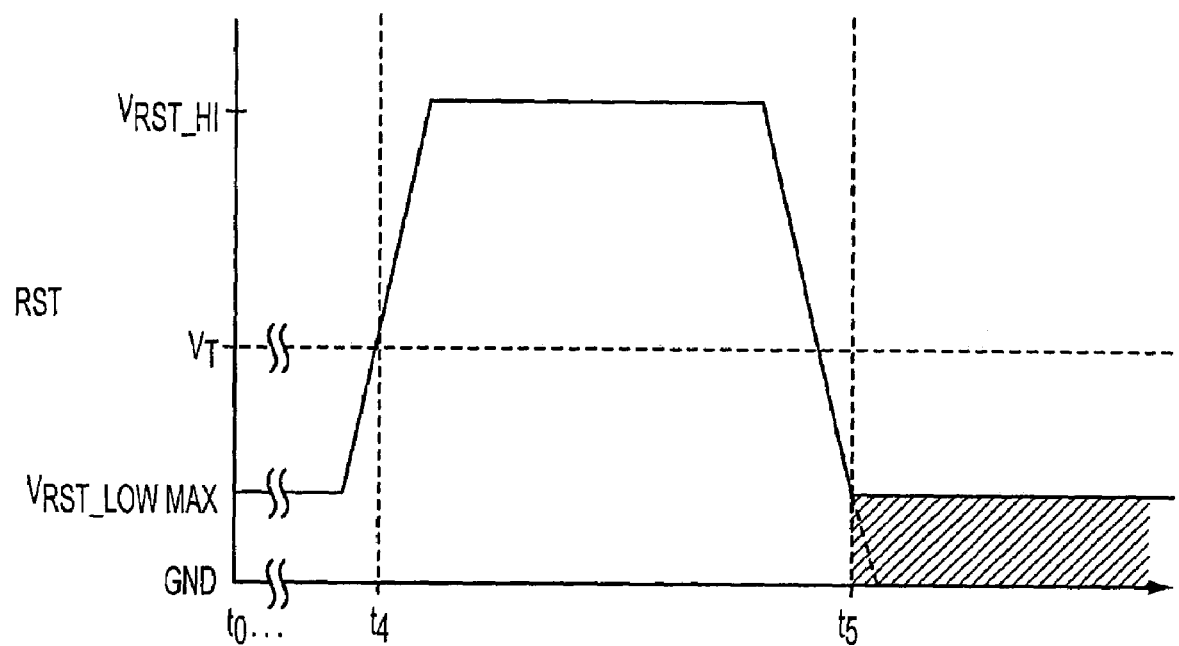
FIG. 7 is a blown-up timing diagram of the RST signal during the beginning of a readout period of a CMOS imager circuit in accordance with an embodiment of the invention.

FIG. 7 illustrates an enlarged view of the pulse of the RST signal during the beginning of the readout period, $t_4$-$t_5$. The readout period begins at $t_4$ as RST crosses the reset transistor 60 threshold voltage VT. At $t_5$ RST has dropped to $V_{RST\_LOW}$, in this case, $V_{RST\_LOW\,MAX}$, however it should be clear that $V_{RST\_LOW}$ could drop to any level within the shaded region from ground to $V_{RST\_LOW\;MAX}$. Maintaining $V_{RST\_LOW}$ within this region will reduce the charge injection, thereby increasing the available voltage swing of the floating diffusion region 50. Accordingly, the linear full well will be increased, improving the lag performance. In addition, the peak conversion gain is increased due to the non-linearity of the floating diffusion junction capacitance. The positive $V_{RST\_LOW}$ also enables excessive charges to escape to $V_{AAPIX}$ when the floating diffusion region 60 is full, thereby serving as an anti-blooming gate when capturing high contrast scenes. The pixel construction is the same as a conventional pixel, for example, as illustrated in FIGS. 1 and 2, or can be other conventional pixel readout structures of other pixel or array designs. However, the controller 250 for generating signals for array operation provides a reset signal which is at a level above ground and less than or equal to $V_{RST\_LOW\,MAX}$ when the reset transistor is turned off during read out.

Figure 8:
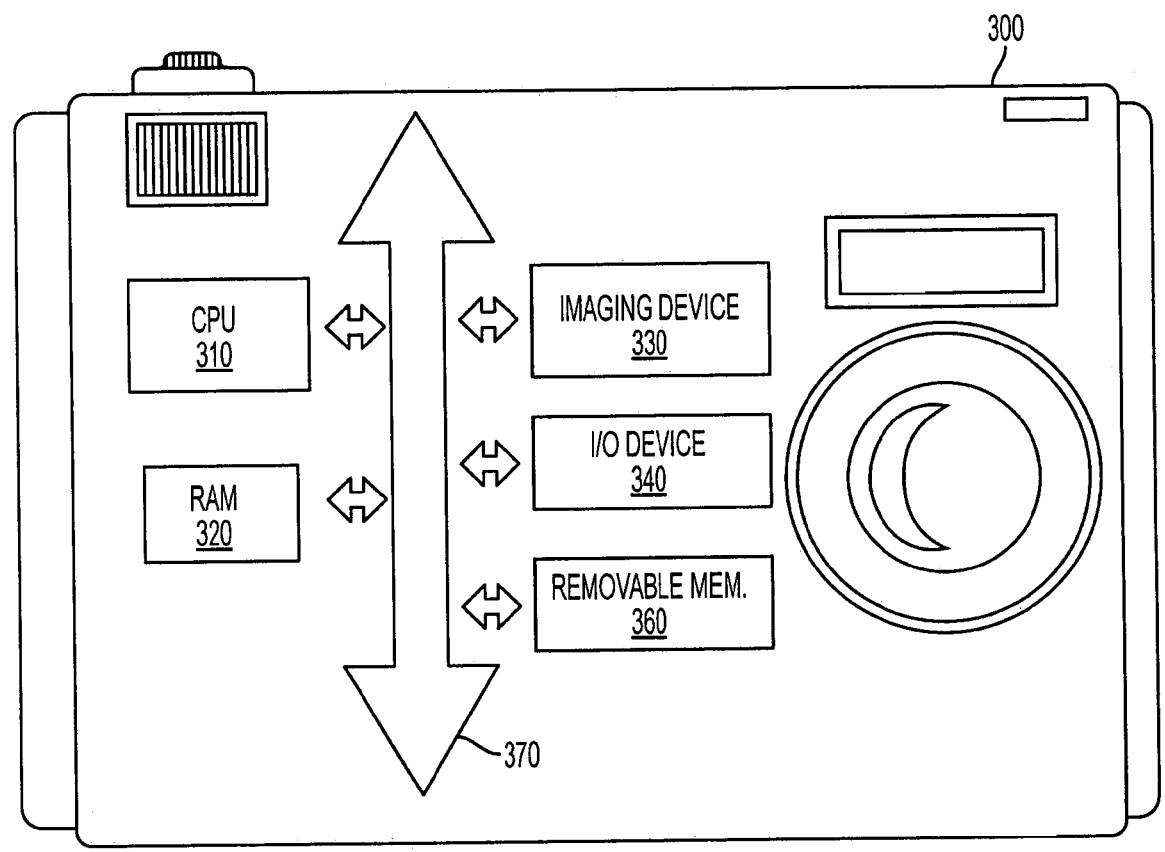
FIG. 8 shows processor system incorporating at least one imager constructed in accordance with an embodiment of the invention.

A typical processor based system which may include an imager circuit according to the present invention is a camera 300, which may be a digital still or video camera, or other type of camera, as shown in FIG. 8. It should be noted that the illustration of a camera is not intended to be limiting and that such an imager circuit could be included in any processor system including a computer system, scanner, machine vision, vehicle navigation, video phone, cell phone, personal digital assistant, surveillance system, auto focus system, star tracker system, motion detection system, and other systems employing an imager.

The illustrated camera system 300, generally comprises a central processing unit (CPU) 310, such as a microprocessor for controlling camera operations, that communicates with an input/output (I/O) device 340 over a bus 370. The imaging device 330, also communicates with the CPU 310 over the bus 370. The system 300 also may include random access memory (RAM) 320, and can include removable memory 360, such as flash memory, which also communicate with the CPU 310 over the bus 370. The imaging device 330 may be combined with a processor, such as a CPU, digital signal processor, or microprocessor, with or without memory storage on a single integrated circuit or on a different ship than the processor.

It should be noted that although the invention has been described with specific reference to CMOS imaging circuits having a photodiode and a floating diffusion region, the invention has broader applicability and may be used in any CMOS imaging apparatus. The above description and drawings illustrate preferred embodiments which achieve the objects, features and advantages of the present invention. It is not intended that the present invention be limited to the illustrated embodiments. Any modification of the present invention which comes within the spirit and scope of the following claims should be considered part of the present invention.

What is claimed as new and desired to be protected by Letters Patent of the United States is:

1. A method of operating a pixel of an image sensor, said pixel having a reset transistor having a first source/drain terminal coupled to a charge storage node which receives photogenerated charges and a second source/drain terminal for receiving a reset supply voltage, said method comprising:
   providing a reset supply voltage to said second source/drain terminal of the reset transistor;
   collecting charge in a pinned photodiode;
   pulsing a signal at a gate of the reset transistor to a voltage greater than a reset transistor threshold voltage causing said charge storage node to be reset; and
   after said pulsing maintaining a positive voltage level at the reset transistor gate during at least a portion of a pixel readout period, said positive voltage level not exceeding a voltage representing the maximum charge which can be stored at said charge storage node, and said positive voltage level not exceeding an approximate value of the voltage level of the reset voltage minus a value which is a pinning voltage of the photodiode multiplied by a value of a capacitance of the photodiode divided by a capacitance of the charge storage node.

2. The method of claim 1 wherein said reset transistor and storage node are part of a pixel circuit.

3. The method of claim 1 further comprising:
   transferring said charge collected in said pinned photodiode to the charge storage node.

4. The method of claim 3 further comprising:
   sampling and storing a reset signal at the charge storage node prior to transferring said collected charge of the photosensor to the charge storage node; and
   sampling and storing an image signal at the charge storage node after said charge collected in said pinned photodiode has been transferred to said charge storage node, said positive voltage being maintained during said acts of sampling and storing said reset signal, transferring the collected charge, and sampling and storing an image signal.

5. The method of claim 4 further comprising operating a transfer transistor to transfer said charge collected in said pinned photodiode to the charge storage node.

6. The method of claim 5 wherein the positive voltage at the gate of the reset transistor is maintained during all periods of operation of said pixel excluding the period of operation corresponding to resetting the charge storage node.

7. The method of claim 5 wherein said pulsing and maintaining occur during a readout period of said pixel, said method further comprising dropping the voltage at the gate of the reset transistor to ground during all periods of operation of the pixel outside said readout period.

8. The method of claim 5 wherein said pulsing and maintaining occur during a readout period of said pixel, said method further comprising maintaining a positive voltage that does not exceed said reset supply voltage plus the threshold voltage of the reset transistor during operation of the pixel outside said readout period.

9. The method of claim 5 wherein said imaging sensor comprises a pixel array and is employed in a digital camera.

10. The method of claim 1 wherein the positive voltage level does not exceed the voltage level of the reset voltage minus the maximum voltage level which can be held by the pinned photodiode.

11. The method of claim 1, wherein the positive voltage level is greater than 0V and less than 2.5V.

12. The method of claim 11, wherein the positive voltage level is approximately 2.05V.

13. The method of claim 1, wherein the reset supply voltage is 2.8 volts, the photosensor is a pinned photodiode having a pinning voltage of 1.5 volts and a capacitance of 1 femtoFarad, and the change storage node has a capacitance of 2 femtoFarads, and wherein the positive voltage level is 2.05V.

14. A method of operating a pixel of an image sensor comprising:
   providing a reset supply voltage to one source/drain terminal of a reset transistor which has another terminal connected to a charge storage node;
   pulsing a signal to a gate of the reset transistor to a voltage greater than a reset transistor threshold voltage causing said charge storage node to be reset;
   reading out a reset signal from said storage node;
   transferring charge from a photodiode to said storage node;
   reading out transferred charge at said storage node; and
   after said pulsing maintaining a positive voltage level at the reset transistor gate during readout of said reset signal and transferred charge, said positive voltage being less than or equal to an appropriate voltage value corresponding to said read supply voltage minus a value corresponding to a pinning voltage of said photodiode multiplied by a value of the capacitance of the photodiode divided by the capacitance of the storage node.

15. An image sensor comprising:
   a pixel circuit comprising:
      a photosensor for accumulating charge;
      a charge storage node;
      a transfer transistor for transferring charge from the photosensor to the charge storage node; and
      a reset transistor for resetting the charge storage node to a predetermined reset value;
   a circuit for supplying a control signal to a gate of the reset transistor during at least a portion of the operation of said pixel, said control signal having a first value sufficient to turn on said reset transistor to reset said storage node and a second value which is sufficient to turn off said reset transistor and which is greater than ground but less than a maximum value, said maximum value being substantially equal to a value of a reset supply voltage of said reset transistor minus a maximum signal voltage which can be generated by the photo sensor.

16. The image sensor of claim 15 further comprising:
   a source-follower transistor to receive charge from the charge storage node; and
   a row select transistor connected to the source-follower transistor for outputting a signal produced by the source-follower transistor.

17. The circuit of claim 15, wherein the photo sensor is a pinned photodiode.

18. The image sensor of claim 17 wherein the circuit for supplying supplies said second value with a maximum value which is approximately the voltage level of the reset supply voltage minus a value of the pinning voltage level of the photodiode times a value of the capacitance of the photodiode divided by the capacitance of the change storage node.

19. The image sensor as in claim 15 wherein said circuit for supplying said control signal provides said first and second values during a pixel readout period which begins with the supply of said first value and ends with the readout of said transferred charge value.

20. The image sensor of claim 19 wherein said circuit supplies a third value for said control signal during a pixel operation period outside said readout period, said third value being a ground signal value.

21. The image sensor of claim 19 wherein said circuit supplies a third value for said control signal during a pixel operation period outside said readout period, said third value being a value corresponding to a threshold voltage of said transistor plus a reset supply voltage of said readout transistor.

22. An imaging system comprising:
   a processor;
   an image sensor coupled to said processor, said image sensor comprising:
      an array of pixels, each pixel comprising:
         a photosensor configured as a pinned photodiode;
         a reset transistor;
         a floating diffusion region;
         a circuit for reading out a value stored at said floating diffusion region; and
         a circuit for supplying a reset supply voltage to the reset transistor; and
      a circuit for supplying a control signal to the gate of a said reset transistors of said array during a readout period of a pixel containing said reset transistor, said control signal having a first value sufficient to turn on said reset transistor to reset an associated floating diffusion region and a second value which is sufficient to turn off said reset transistor and greater than ground but less than a maximum value, said maximum value being an approximate value of the voltage level of the reset voltage minus a value which is a pinning voltage of the pinned photodiode multiplied by a value of a capacitance of the pinned photodiode divided by a capacitance of the charge storage node.

23. The system of claim 22 wherein the system is part of a digital still camera.

24. The system of claim 22 wherein said system is part of a video capture camera.

* * * * *

UNITED STATES PATENT AND TRADEMARK OFFICE
CERTIFICATE OF CORRECTION

| | | |
|---|---|---|
| PATENT NO. | : 7,619,671 B2 | Page 1 of 1 |
| APPLICATION NO. | : 11/488110 | |
| DATED | : November 17, 2009 | |
| INVENTOR(S) | : Li et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 608 days.

Signed and Sealed this

Twenty-sixth Day of October, 2010

David J. Kappos
*Director of the United States Patent and Trademark Office*